United States Patent [19]
Mauritz

[11] Patent Number: 4,614,471
[45] Date of Patent: Sep. 30, 1986

[54] EXPANSION ANCHOR

[75] Inventor: Bernd Mauritz, Munich, Fed. Rep. of Germany

[73] Assignee: Hilti Aktiengesellschaft

[21] Appl. No.: 593,812

[22] Filed: Mar. 27, 1984

[30] Foreign Application Priority Data

Mar. 28, 1983 [DE] Fed. Rep. of Germany ....... 3311264

[51] Int. Cl.[4] .............................................. F16B 13/04
[52] U.S. Cl. ........................................ 411/21; 411/60; 411/65; 405/259
[58] Field of Search .................................... 411/21–23, 411/29–31, 42, 55, 60, 64, 65, 66, 67, 68, 63, 78; 405/259–261

[56] References Cited

U.S. PATENT DOCUMENTS

| | | | |
|---|---|---|---|
| 282,501 | 8/1883 | Cornell | 411/65 |
| 843,271 | 2/1907 | Hanlon | 411/21 |
| 929,979 | 8/1909 | Pleister | 411/21 |
| 1,021,794 | 4/1912 | Pleister | 411/21 |
| 4,263,833 | 4/1981 | Loudin et al. | 411/60 |

FOREIGN PATENT DOCUMENTS

| | | | |
|---|---|---|---|
| 2535066 | 3/1977 | Fed. Rep. of Germany. | |
| 441641 | 5/1912 | France | 411/64 |
| 903593 | 2/1982 | U.S.S.R. | 411/21 |

*Primary Examiner*—Gary L. Smith
*Assistant Examiner*—Neill Wilson
*Attorney, Agent, or Firm*—Toren, McGeady, Stanger, Goldberg & Kiel

[57] ABSTRACT

An expansion anchor is used in a hole in a receiving material where the hole is undercut. The expansion anchor includes an axially elongated anchor sleeve containing slots extending in the axial direction. Expansion interlock members are radially displaceably mounted in the slots. A fastening bolt can be threaded into the sleeve so that it radially displaces and secures the interlock members in the undercut portion of the hole. Each interlock member has a shaped surface facing radially inwardly in the sleeve and the shaped surface is contacted by the fastening bolt as it is moved into the sleeve. The trailing end of the shaped surface is formed so that it is not contacted by the fastening bolt as the bolt is moved through the sleeve.

5 Claims, 3 Drawing Figures

EXPANSION ANCHOR

SUMMARY OF THE INVENTION

The present invention is directed to an expansion anchor for insertion into a hole in a receiving material where an axially extending part of the hole is undercut. The expansion anchor includes an axially extending anchoring sleeve, expansion interlock members mounted in the sleeve and a fastening bolt which can be threaded into a threaded bore in the sleeve. The interlock members are supported within axially extending slots in the anchoring sleeve so that the fastening bolt can radially displace the interlock members. Each interlock member has an axially extending surface facing inwardly toward the center of the sleeve.

A known expansion anchor of the type mentioned above is secured by expansion locking members which are mounted in slots in an anchoring sleeve and can be moved radially outwardly into positive engagement with the undercut part of a hole formed in a receiving material. The radial movement of the locking members which have an axially extending surface projecting toward the center of the anchoring sleeve, is effected by a conically shaped expansion bolt. The expansion bolt is driven between the locking members by turning the bolt.

The insertion movement of the expansion bolt is achieved by the interaction of a helical groove on the outside surface of the expansion bolt and by cams on the expansion locking members which engage in the groove. To displace the expansion bolt it has a square section at its end adjacent the trailing end of the anchoring sleeve. A wrench can be fitted onto the square section for turning the expansion bolt. After the anchor has been secured in place, a fastening bolt for carrying the load supported by the anchor is screwed into an internal thread in the anchoring sleeve.

One notable disadvantage of this expansion anchor is its cost, since separate parts are required for effecting anchoring and attaching a load onto the anchor. In addition the interengagement between the expansion bolt and the locking members via the cams is a relatively complicated arrangement.

It is the primary object of the present invention to provide an expansion anchor for insertion into the undercut part of a hole in a receiving material where the expansion anchor is of a simple arrangement and affords easy installation.

In accordance with the present invention, a fastening bolt, acting as the expanding member, has an actuating shoulder at its leading end which moves the interlocking members radially outwardly. The surfaces of the interlocking members facing inwardly within the anchoring sleeve are shaped at their trailing ends so that they are not contacted by the actuating shoulder on the bolt.

Due to the cooperating relationship between the actuating shoulder on the fastening bolt and the inwardly directed surfaces on the interlocking members, the fastening bolt also acts as the expanding member. As a result, a separate expanding member, which in the prior art requires separate actuation and special engagement means for connecting it to the locking members, is obviated.

The fastening bolt, designed as a standard screw, is moved through the anchor sleeve in threaded engagement with the bore in the sleeve, and the circumferential rim on the leading face of the standard screw forms the actuating shoulder as it moves axially through the sleeve into contact with the interlocking members. It would also be possible to use as the fastening bolt a threaded bolt with a smaller diameter leading end. The fastening bolt with the smaller diameter leading end may be either cylindrical or tapered. If such a fastening bolt is used, the expansion interlocking members can project further inwardly toward the center of the anchoring sleeve. One advantage of this arrangement is that a comparably long radial travel of the interlocking members is achieved.

The length of the fastening bolt inserted into the bore in the anchoring sleeve is selected so that the interlocking members reach the anchored position before a part to be secured by the fastening bolt is moved into the fastened position.

The expansion interlocking members may be displaced into the undercut portion of the hole in the receiving material by means of the fastening bolt either by straight radial movement or by a pivoting movement in the radial direction. A radially pivotal movement of the interlocking members permits the use of the expansion anchor in holes where the undercut part is frusto-conically shaped, the undercut part may be tapered in the anchor insertion direction or in the direction opposite to it. In either instance, the fastening bolt remains between the expansion interlocking members and maintains the members in the or anchored position within the undercut part of the hole so that the interlocking members cannot return into the insertion position of the expansion anchor. In a preferred embodiment, the inwardly facing surfaces of the expansion interlocking members engaged by the fastening bolt can be inclined so that, in the expanded state, a parallel and thus larger bearing surface area is provided for the shank of the fastening bolt. Such an arrangement reliably displaces the interlocking members so that they remain in the anchoring position.

Preferably, the ends of the inwardly facing surfaces of the interlocking members which are contacted by the fastening bolt are located outside of the path of the bolt as it moves into contact with the interlocking members. Such an arrangement is particularly desirable when a standard screw is used as the fastening bolt, because the actuating shoulder, formed by the circumferential rim on the leading end of the bolt, which has a diameter close to that of the fastening bolt, reliably enters into the space within the anchoring sleeve between the interlocking members.

In one preferred embodiment, a spring member is arranged to fix the expansion interlocking members in the insertion position so that the trailing end of the inwardly facing surfaces on the interlocking members are located outside the path of the actuating shoulder or of the threaded surface in the anchoring sleeve. Further, the spring member prevents the interlocking members from being displaced out of the slots in the anchoring sleeve before the expansion anchor is secured within the hole in the receiving material.

In one arrangement, the spring member is formed as a spring ring extending through elongated holes formed in the expansion interlocking members. The spring ring is stressed by engagement with the wall of the anchoring sleeve bore. Such a spring ring does not interfere with the insertion of the expansion anchor into a hole in a receiving material and secures the interlocking members in position when the expansion anchor is inserted into the hole.

If the expansion interlocking members are especially long, it may be helpful to provide a second spring ring to limit the radial mobility of the interlocking members in the slots in the anchor sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
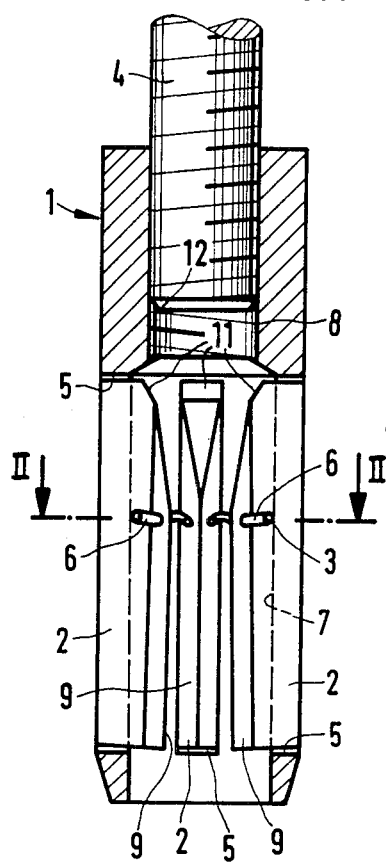
FIG. 1 is an axially extending partly sectional view of an expansion anchor embodying the present invention and illustrated in the insertion condition.

In FIG. 1 an expansion anchor is illustrated including an axially elongated anchoring sleeve 1 with expansion interlocking members 2 held in position within the sleeve by a spring ring 3. The leading end of a fastening bolt 4 is shown threaded into the trailing end of the anchoring sleeve 1 and the bolt is a standard screw. As viewed in FIGS. 1 and 3 the upper end of the anchoring sleeve 1, the interlocking members 2 and the fastening bolt 4 is its trailing end, and the lower end is its leading end.

Anchoring sleeve 1 has four equiangularly spaced axially extending slots 5 in which the expansion interlocking members 2 are secured against any axial movement. As shown in the drawing, each of the interlocking members 2 is provided intermediate its ends with an elongated hole 6 with the elongated direction of the hole extending transversely of the axial direction of the anchoring sleeve 1. The spring ring 3 extends through the holes in each of the interlocking members 2. In FIG. 1 the expansion anchor is shown in the insertion condition, that is in the condition in which it can be inserted into a hole in a receiving material, such as the hole 14 shown in FIG. 3 where the receiving material is concrete 15. It can be appreciated that the hole 14 can be formed in other hard receiving materials other than concrete. In the insertion condition the spring ring 3 is biased against the inside surface of the anchoring sleeve wall 7 in the region of the slots 5. As can be seen in the drawings the diameter of the bore formed by the inside surface of the anchoring sleeve wall 7 has a smaller diameter extending from the trailing end to the beginning of the slots where the diameter increases so that the interlocking members 2 project radially inwardly into the bore formed in the sleeve. The smaller diameter part of the bore has an internal thread 8 into which the fastening bolt 4 can be screwed.

Figure 2:
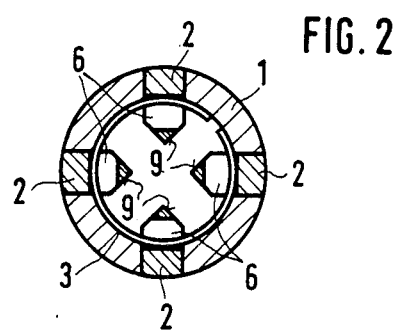
FIG. 2 is a cross-sectional view of the expansion anchor taken along the line II—II in FIG. 1.

As shown in FIG. 2, the four expansion interlocking members 2 are mounted in the anchoring sleeve 1. For purposes of assembly, the inwardly facing surfaces 9 of the interlocking members 2 are shaped in the manner of a peaked roof. The trailing end of each of the inwardly facing surfaces 9 is disposed radially outwardly outside the projection of the internal thread and, therefore, also outside the path of the actuating shoulder 12 formed by the circumferential rim on the leading end of the fastening bolt 4. Consequently, as the fastening bolt 4 is threaded into the anchoring sleeve 1 from the trailing end toward the leading end, due to the shaped configuration at the trailing ends 11 of the surfaces 9 of the interlocking members 2, the actuating shoulder 12 on the bolt will be guided reliably along the inwardly facing surfaces 9.

Figure 3:
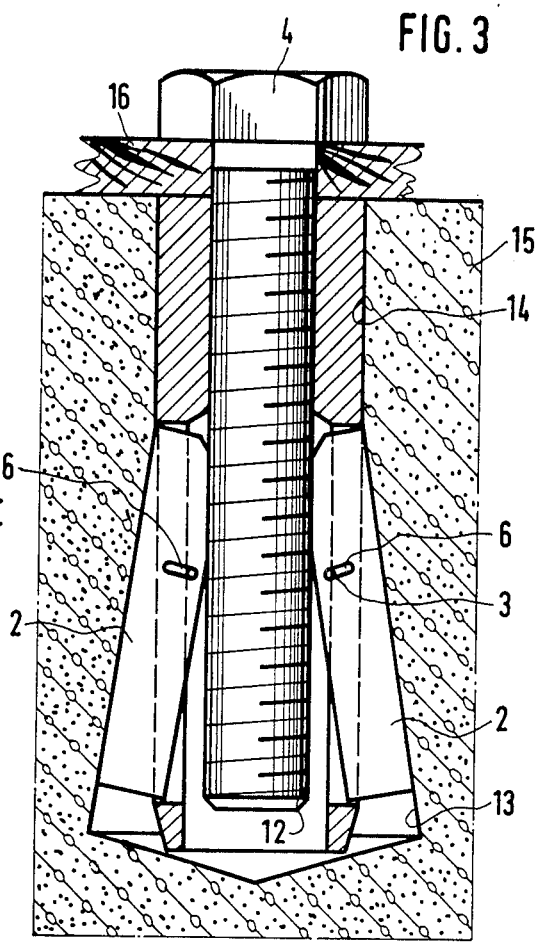
FIG. 3 is an axially extending sectional view of the expansion anchor of FIG. 1 illustrated in the anchored or locked condition.

The anchored or locked condition of the expansion anchor, as illustrated in FIG. 3, is attained by threading the fastening bolt toward the leading end of the anchoring sleeve so that it moves between the interlocking members 2 in engagement with the trailing portions of the surfaces 9. As the fastening bolt 4 contacts the inwardly directed surfaces 9, the expansion interlocking members are displaced radially outwardly entering into the frusto-conically undercut section 13 in the hole 14. After the interlocking members 2 have been secured in anchoring or locking engagement with the undercut section 13, the head of the fastening bolt 4 contacts the part to be secured to the receiving material 15. As can be seen by comparing FIGS. 1 and 3, in the radial displacement of the interlocking members 2, the interlocking members slide relative to the spring ring 3 so that they pivot in the radial direction. Further, it can be noted that the slots 5 terminate short of the leading end of the anchoring sleeve so that in the insertion condition the interlocking members 2 do not extend radially outwardly from the outer surface of the anchoring sleeve.

While specific embodiments of the invention have been shown and described in detail to illustrate the application of the inventive principles, it will be understood that the invention may be embodied otherwise without departing from such principles.

I claim:

1. Expansion anchor for insertion into an axially extending hole formed in a receiving material where the hole has an axially extending undercut section spaced inwardly from the surface of the receiving material in which the hole is formed, comprising an axially elongated anchoring sleeve having a circumferentially extending outside surface, an axially elongated fastening bolt, and locking members mounted in said anchoring sleeve and being elongated in the axial direction of said sleeve, each of said anchoring sleeve, fastening bolt and locking members having a leading end and a trailing end extending transversely of the axial direction of said sleeve relative to the direction of insertion of said expansion anchor into the hole in the receiving material, said anchoring sleeve having an axially extending bore therein extending from the trailing end toward the leading end with the bore having a threaded section extending from adjacent the trailing end toward the leading end and terminating at a location spaced from the leading end and arranged to receive said fastening bolt in threaded engagement, said anchoring sleeve having a plurality of angularly spaced axially extending slots therein located between the leading end of said anchor sleeve and the threaded section in the bore in said anchoring section, each said locking member mounted and supported in the axial direction of said anchoring sleeve in one of said slots and being displaceable in the radial direction outwardly from said anchoring sleeve between an expansion anchor insertion condition for placement into the receiving material and an expansion anchor locking condition, each said locking member having a first surface and a second surface each extending in the trailing end-leading end direction and said first surface facing inwardly toward the axis of said anchoring sleeve and said second surface facing outwardly in the opposite direction, each said first surface having a first axially extending section adjacent the trailing end of said locking member inclined inwardly toward the axis of said anchoring sleeve in the direction toward the leading end of said locking member, said fastening bolt having an actuating shoulder at the leading end thereof, said first surface located radially inwardly of the prolongation of the leading end of said fastening bolt in the insertion condition, and said actuating shoulder and said fastening bolt extending axially from said actuating shoulder arranged to contact said first section of said first surfaces on said locking members and to displace said locking members radially outwardly into the undercut section of the hole in the receiving material, and in the insertion conditions, said trailing ends of said locking members are located radially outwardly of the path of the actuating shoulder on said fastening bolt, each said locking member has a hole therethrough extending in the circumferential direction of said sleeve with the hole spaced radially outwardly from the first surface of said locking member and radially inwardly from the second surface of said locking member and a spring member extends through said hole in each of said locking members in a plane extending transversely of the axial direction of said sleeve and spaced radially outwardly from said first surface for biasing said locking members into the insertion condition so that the trailing ends of the first surfaces of said locking members are located radially outwardly from the path of said actuating shoulder on said fastening bolt into the bore through said anchoring sleeve.

2. Expansion anchor, as set forth in claim 1, wherein the first surfaces of said locking members extending from the trailing ends thereof are located radially outwardly from the projection of the threaded section of said bore in said anchoring sleeve.

3. Expansion anchor for insertion into an axially extending hole formed in a receiving material where the hole has an axially extending undercut section spaced inwardly from the surface of the receiving material in which the hole is formed, comprising an axially elongated anchoring sleeve, an axially elongated fastening bolt, and locking members mounted in said anchoring sleeve and being elongated in the axial direction of said sleeve, each of said anchroing sleeve, fastening bolt and locking members having a leading end and a trailing end extending transversely of the axial direction of said sleeve relative to the direction of said sleeve relative to the direction of insertion of said expansion anchor into the hole in the receiving material, said anchoring sleeve having an axially extending bore therein extending from the trailing end toward the leading end with the bore having a threaded section extending from adjacent the tailing end toward the leading end and terminating at a location spaced from the leading end and arranged to receive said fastening bolt in threaded engagement, said anchoring sleeve having a plurality of angularly spaced axially extending slots therein located between the leading end of said anchor sleeve and the threaded section in the bore in said anchoring section, each said locking member mounted in one of said slots and being displaceable in the radial direction outwardly from said anchoring sleeve between an expansion anchor insertion condition for placement into the hole in the receiving material and an expansion anchor locking condition, each said locking member having a first surface extending in the trailing end-leading end direction and facing toward the axis of said anchoring sleeve, said fastening bolt having an actuating shoulder at the leading end thereof arranged to contact said first surfaces on said locking members and to displace said locking members radially outwardly into the undercut section of the hole in the receiving material, and in the insertion condition, said trailing ends of said locking members are located radially outwardly of the path of the actuating shoulder on said fastening bolt with said first surfaces spaced from the trailing end of said locking member extending in the insertion condition radially inwardly into the path of said actuating shoulder on said fastening bolt, and a spring member extends through each of said locking members in a plane extending transversely of the axial direction of said sleeve and spaced radially outwardly from said first surface for biasing said locking members into the insertion condition so that the trailing ends of the first surfaces of said locking members are located radially outwardly from the path of said actuating shoulder on said fastening bolt into the bore through said anchoring sleeve, said spring member is a spring ring, each of said locking members having an elongated hole therein with the elongated direction thereof extending transversely of the trailing end-leading end direction of said locking member, said spring ring extending through and being displaceable relative to said elongated holes in said locking members, and said locking members being pivotally displaceable about said spring member from the insertion condition into the locking condition.

4. Expansion anchor, as set forth in claim 1, wherein the bore in said anchoring sleeve having a first diameter for said threaded section extending from the trailing end thereof and a second diameter for the remainder of the bore from the threaded section to the leading end of said anchoring sleeve with the second diameter being greater than the first diameter so that the surface of the bore throughout the section thereof having the second diameter is spaced outwardly from the surface in the threaded section, and in the expansion anchor insertion condition the first surfaces of said locking members project inwardly from the surface having the second diameter.

5. Expansion anchor for insertion into an axially extending hole formed in a receiving material where the hole has an axially extending undercut section spaced inwardly from the surface of the receiving material in which the hole is formed, comprising an axially elongated anchoring sleeve, an axially elongated fastening bolt, and locking members mounted in said anchoring sleeve and being elongated in the axial direction of said sleeve, each of said anchoring sleeve, fastening bolt and locking members having a leading end and a trailing end extending transversely of the axial direction of said sleeve relative to the direction of insertion of said expansion anchor into the hole in the receiving material, said anchoring sleeve having an axially extending bore therein extending from the trailing end toward the leading end with the bore having a threaded section extending from adjacent the trailing end toward the leading end and terminating at a location spaced from the leading end and arranged to receive said fastening bolt in threaded engagement, said anchoring sleeve having a plurality of angularly spaced axially extending slots therein located between the leading end of said anchor sleeve and the threaded section in the bore in said anchoring section, each said locking member mounted in one of said slots and being displacable in the radial direction outwardly from said anchoring sleeve between an expansion anchor insertion condition for placement into the hole in the receiving material and an expansion anchor locking condition, each said locking member having a first surface extending in the trailing end-leading end direction and facing inwardly toward the axis of said anchoring sleeve, said fastening bolt having an actuating shoulder at the leading end thereof arranged to contact said first surfaces on said locking members and to displace said locking members radially outwardly into the undercut section of the hole in the receiving material, and in the insertion condition, said trailing ends of said locking members are located radially outwardly of the path of the actuating shoulder on said fastening bolt with said first surfaces spaced from the trailing end of said locking member extending in the insertion condition radially inwardly into the path of said actuating shoulder on said fastening bolt, and a spring member extends through each of said locking members in a plane extending transversely of the axial direction of said sleeve and spaced radially outwardly from said first surface for biasing said locking members into the insertion condition so that the trailing ends of the first surfaces of said locking members are located radially outwardly from the path of said actuating shoulder on said fastening bolt into the bore through said anchoring sleeve, the bore in said anchoring sleeve having a first diameter for said threaded section extending from the trailing end thereof and a second diameter for the remainder of the bore from the threaded section to the leading end of said anchoring sleeve with the second diameter being greater than the first diameter so that the surface of the bore throughout the section thereof having the second diameter is spaced outwardly from the surface in the threaded section, and in the expansion anchor insertion condition the first surfaces of said locking members project inwardly from the surface having the second diameter, each of said locking members having an elongated hole therein with the elongated direction thereof extending transversely of the trailing end-leading end direction of said locking members, and a spring ring extending through said elongated holes in said locking member and located inwardly of the surface of the bore having the second diameter.

* * * * *